(12) United States Patent
Zipprich

(10) Patent No.: US 9,549,792 B2
(45) Date of Patent: Jan. 24, 2017

(54) DENTAL IMPLANT

(76) Inventor: Holger Zipprich, Seeheim-Jugenheim (DE)

(*) Notice: Subject to any disclaimer, the term of this patent is extended or adjusted under 35 U.S.C. 154(b) by 130 days.

(21) Appl. No.: 13/696,162

(22) PCT Filed: May 5, 2011

(86) PCT No.: PCT/EP2011/002229
§ 371 (c)(1),
(2), (4) Date: Jan. 14, 2013

(87) PCT Pub. No.: WO2011/138029
PCT Pub. Date: Nov. 10, 2011

(65) Prior Publication Data
US 2013/0108984 A1    May 2, 2013

(30) Foreign Application Priority Data

May 5, 2010  (DE) .................. 10 2010 019 582
May 5, 2010  (DE) .................. 10 2010 019 583

(51) Int. Cl.
*A61C 8/00* (2006.01)

(52) U.S. Cl.
CPC ............ *A61C 8/0054* (2013.01); *A61C 8/005* (2013.01); *A61C 8/0013* (2013.01); *A61C 8/0066* (2013.01); *A61C 8/0068* (2013.01); *A61C 8/0069* (2013.01); *A61C 8/0071* (2013.01); *A61C 8/006* (2013.01)

(58) Field of Classification Search
CPC ....... A61C 8/005; A61C 8/006; A61C 8/0018; A61C 8/0066; A61C 8/0068; A61C 8/0069; A61C 8/0075; A61C 8/00; A61C 8/0013; A61C 8/0054; A61C 8/0071

USPC ...................................... 433/172–176, 201.1
See application file for complete search history.

(56) References Cited

U.S. PATENT DOCUMENTS

| 4,324,550 A | 4/1982 | Reuther et al. |
| 4,793,808 A | 12/1988 | Kirsch |
| 4,832,601 A | 5/1989 | Linden |
| 4,850,870 A | 7/1989 | Lazzara et al. |
| 4,854,872 A | 8/1989 | Detsch |

(Continued)

FOREIGN PATENT DOCUMENTS

| CH | 642838 | 5/1984 |
| CH | 696625 | 8/2007 |

(Continued)

OTHER PUBLICATIONS

International Search Report prepared by the European Patent Office on Aug. 18, 2011, for International Application No. PCT/EP2011/002229.

(Continued)

*Primary Examiner* — Cris L Rodriguez
*Assistant Examiner* — Mirayda A Aponte
(74) *Attorney, Agent, or Firm* — Sheridan Ross P.C.

(57) ABSTRACT

The present invention relates to a connection between a post part provided for being screwed into the jawbone and an associated superstructure part to which a dental prosthesis can be fastened. The connection between the post part and the superstructure part has a rotational self-centering action, wherein at least one of the surfaces provided for this purpose has a friction-minimizing modification and/or coating.

11 Claims, 15 Drawing Sheets

(56) References Cited

U.S. PATENT DOCUMENTS

| | | |
|---|---|---|
| 5,015,186 A | 5/1991 | Detsch |
| 5,135,395 A | 8/1992 | Marlin |
| 5,281,140 A | 1/1994 | Niznick |
| 5,302,126 A | 4/1994 | Wimmer et al. |
| 5,407,359 A | 4/1995 | Balfour et al. |
| 5,437,551 A | 8/1995 | Chalifoux |
| 5,674,072 A | 10/1997 | Moser et al. |
| 5,766,179 A | 6/1998 | Faccioli et al. |
| 5,782,918 A | 7/1998 | Klardie et al. |
| 5,947,733 A | 9/1999 | Sutter et al. |
| 5,989,026 A | 11/1999 | Rogers et al. |
| 6,217,331 B1 * | 4/2001 | Rogers ............... A61C 8/0001 433/173 |
| 6,500,003 B2 | 12/2002 | Nichinonni |
| 6,652,765 B1 | 11/2003 | Beaty |
| 2003/0013068 A1 | 1/2003 | Gittleman |
| 2003/0194679 A1 | 10/2003 | Odrich et al. |
| 2004/0185419 A1 | 9/2004 | Schulter et al. |
| 2005/0042573 A1 | 2/2005 | Lustig et al. |
| 2005/0186537 A1 | 8/2005 | Gersberg |
| 2006/0110706 A1 | 5/2006 | Jorneus et al. |
| 2006/0141418 A1 * | 6/2006 | Heo .......................... 433/173 |
| 2006/0172257 A1 * | 8/2006 | Niznick ............... A61C 8/0022 433/173 |
| 2008/0182227 A1 | 7/2008 | Wolf et al. |
| 2008/0241792 A1 * | 10/2008 | Rossler et al. ................ 433/174 |
| 2008/0261176 A1 * | 10/2008 | Hurson ......................... 433/174 |
| 2009/0075236 A1 * | 3/2009 | Towse et al. ................. 433/174 |
| 2009/0305190 A1 * | 12/2009 | Zipprich .......................... 433/173 |
| 2010/0240009 A1 | 9/2010 | Gogarnoiu |
| 2013/0337410 A1 | 12/2013 | Ten Bruggenkate |
| 2014/0106305 A1 | 4/2014 | Jacoby et al. |

FOREIGN PATENT DOCUMENTS

| | | |
|---|---|---|
| DE | 19959366 | 6/2001 |
| DE | 10340059 | 2/2005 |
| DE | 102006036020 | 2/2008 |
| DE | 102008054138 | 5/2010 |
| EP | 0015599 | 9/1980 |
| EP | 1547543 | 6/2005 |
| EP | 2039320 | 3/2009 |
| KR | 10-2007-0009060 | 1/2007 |
| WO | WO 99/52466 | 10/1999 |
| WO | WO 02/26154 | 4/2002 |
| WO | WO 2004/008983 A1 | 1/2004 |
| WO | WO 2004/073541 | 9/2004 |
| WO | WO 2004/080328 A1 | 9/2004 |
| WO | WO 2006/109176 | 10/2006 |
| WO | WO 2008/011948 | 1/2008 |
| WO | WO 2010/049135 | 5/2010 |

OTHER PUBLICATIONS

International Search Report prepared by the European Patent Office on Jul. 31, 2007, for International Application No. PCT/EP2007/003480; Applicant, Holger Zipprich.

Written Opinion for International (PCT) Application No. PCT/EP2007/003480, mailed Apr. 20, 2007.

International Preliminary Report on Patentability prepared by the International Preliminary Examining Authority for International Application No. PCT/EP2007/003480 and English translation.

International Search Report prepared by the European Patent Office on May 14, 2012, for International Application No. PCT/EP2012/000413.

Official Action for U.S. Appl. No. 12/297,570 mailed Apr. 11, 2011, 15 pages.

Official Action for U.S. Appl. No. 12/297,570 mailed Jan. 5, 2012, 9 pages.

Official Action for U.S. Appl. No. 12/297,570 mailed Jan. 3, 2013, 18 pages.

Official Action for U.S. Appl. No. 12/297,570 mailed May 31, 2013, 18 pages.

Official Action for U.S. Appl. No. 13/982,799, mailed Jul. 30, 2014, 11 pages.

* cited by examiner

DENTAL IMPLANT

CROSS REFERENCE TO RELATED APPLICATION

This application is a national stage application under 35 U.S.C. 371 of PCT Application No. PCT/EP2011/002229, having an international filing date of May 5, 2011, which designated the United States, which PCT application claimed the benefit of German Application Serial No. 10 2010 019 583.9, filed on May 5, 2010 and German Application Serial Number 10 2010 019 582.0, filed on May 5, 2010, all of which are incorporated by reference in their entirety.

BACKGROUND OF THE INVENTION

This invention relates generally to dental prosthesis and more specifically to dental implants.

BRIEF SUMMARY OF THE INVENTION

The invention relates to a dental implant having a first implant part provided for being inserted into a jawbone and a second implant part associated therewith, provided for fixing a dental prosthesis, the implant parts being mechanically connectable to each other via a connection pin or contact pin which is formed onto one of the implant parts and which can be pushed into a receiving channel or a profiled recess provided in the other implant part.

Such dental implants, so-called two-part or multi-part implants, are known in many different forms. They are usually inserted into the jawbone in the place of an extracted or shed tooth, in order to hold there, after a healing-in phase of three to four months, a prosthetic part serving as a dental prosthesis or a crown. For this purpose, such a dental implant is usually configured as an appropriately shaped metallic body, the first implant part, as a rule also called post part, being usually inserted into the jawbone by screwing-in, in the intended place. As a rule, the post part includes at its apical end a screw thread, in most cases a self-cutting thread, with which the post part is inserted into the correspondingly prepared implant bed.

Such a dental implant is usually made up in general of two parts, comprising the post part provided for insertion into the jawbone and an associated superstructure part, on which the dental prosthesis provided as a prosthesis or the like can be fastened. The post part as well as the head part or superstructure part usually consist of metal or of a ceramic, in particular of titanium, a titanium alloy, an alloy containing titanium, a zirconium oxide/aluminium oxide ceramic or a ceramic containing the either zirconium oxide or aluminium oxide. The outer surface of the post part is usually provided with a thread, which can be designed as a self-cutting or else as a not self-cutting thread. The post part is usually anchored in a correspondingly prepared implant bed of the jawbone. The construction of the thread provided in the external area of the post part is usually configured for a high primary stability of the arrangement and a uniform forwarding of the forces arising under the chewing load of the dental implant, into the jawbone.

DETAILED DESCRIPTION OF THE INVENTION

Figure 1:
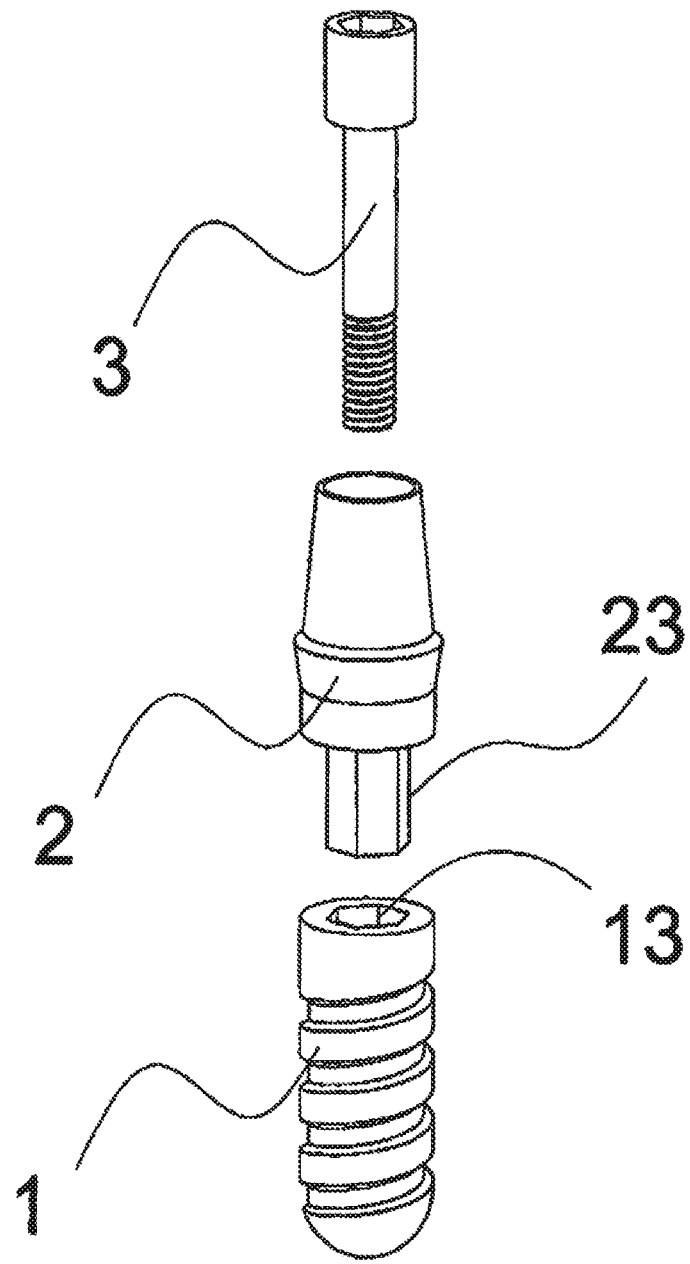
FIG. 1 shows a dental implant according to an embodiment of the invention.

FIG. 1 shows a dental implant (post part) with an associated superstructure part and a connection screw. A profiled recess 13 is formed into the post part 1, which recess is exactly matching the contact pin 23 formed onto the superstructure part 2. In the assembled condition, the profiled recess 13 in the post part 1 forms together with the contact pin 23 formed onto the superstructure part 2 a locking mechanism against all forces and moments except against a force moving the two parts away from each other. To avoid an unintended separation of the two components due to such a force, the connection screw 3 is screwed in with the corresponding tightening torque. Such a connection between the post part and the superstructure part is called an internal connection. If the profiled recess were in the superstructure part and the contact pin, on the post part, this would be called an external connection.

Figure 2:
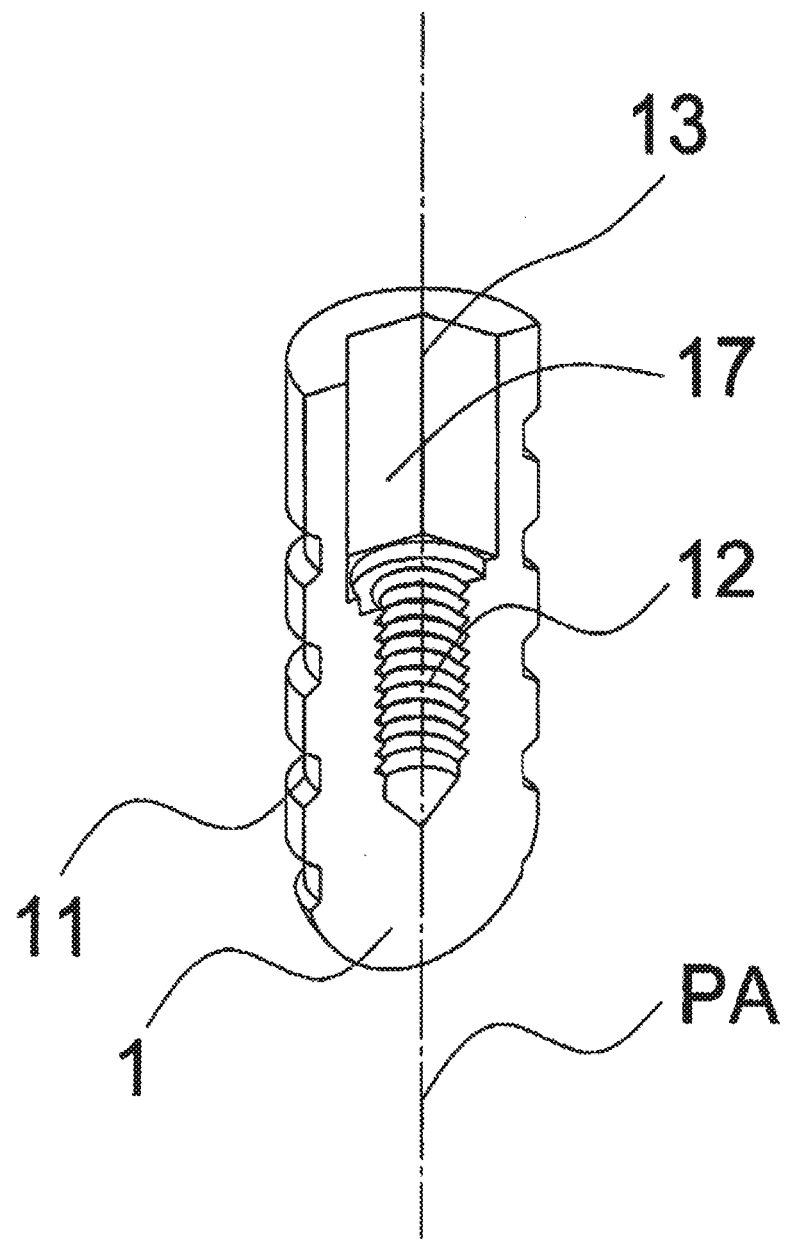
FIG. 2 shows a post part of a dental implant according to an embodiment of the invention.

FIG. 2 shows a post part 1 in a sectional representation with a profiled recess 13 and the functional surfaces 17 which are necessary for the rotational locking mechanism and which are aligned to the axis PA of the post part. The functional surfaces 17 form together a hexagon. This rotational locking mechanism also serves as indexing. That means that via this indexing, the position of the superstructure part 2 on the post part 1 of FIG. 1 can be found again at any moment. Apically to the functional surfaces 17, the inside of the post part 1 is provided with a thread 12, into which the connection screw 3 of FIG. 1 can engage so as to screw the post part 1 and the superstructure part 2 of FIG. 1 against each other. In the outer area of the post part 1, a thread 11 is represented in FIG. 2.

Figure 3:
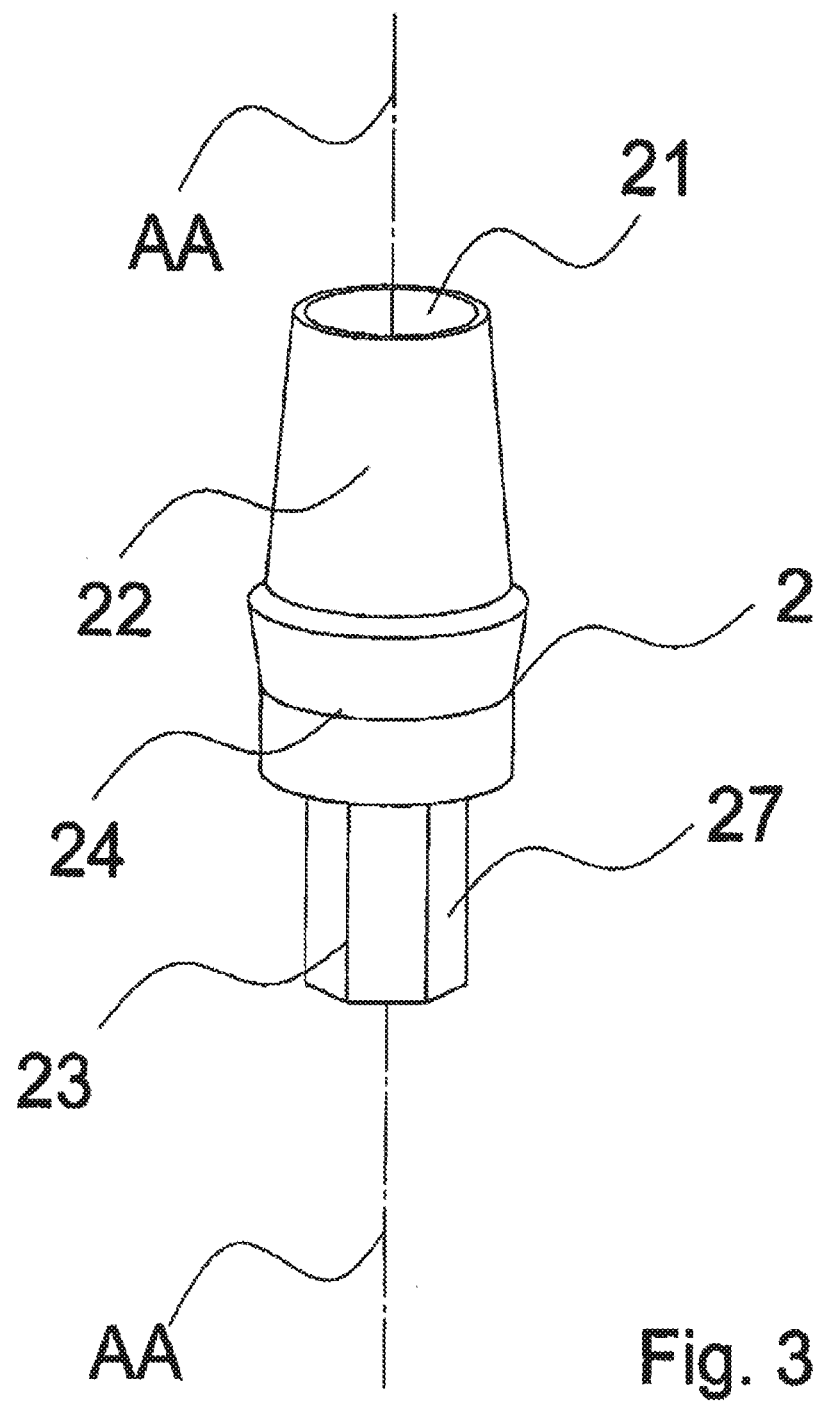
FIG. 3 shows a superstructure of a dental implant according to an embodiment of the invention.

FIG. 3 shows a superstructure part 2 with a contact pin 23 formed thereon in the form of a hexagon. This contact pin 23 has six functional surfaces 27, which are oriented in parallel to the longitudinal axis AA of the superstructure part. The area provided for the penetration through the mucous membrane is marked with reference number 24. In the occlusal direction, a hole 21 is provided, through which the connection screw 3 of FIG. 1 can be passed. On the surface 22, a dental prosthesis can be fixed and fastened, for example, by gluing.

Figure 4:
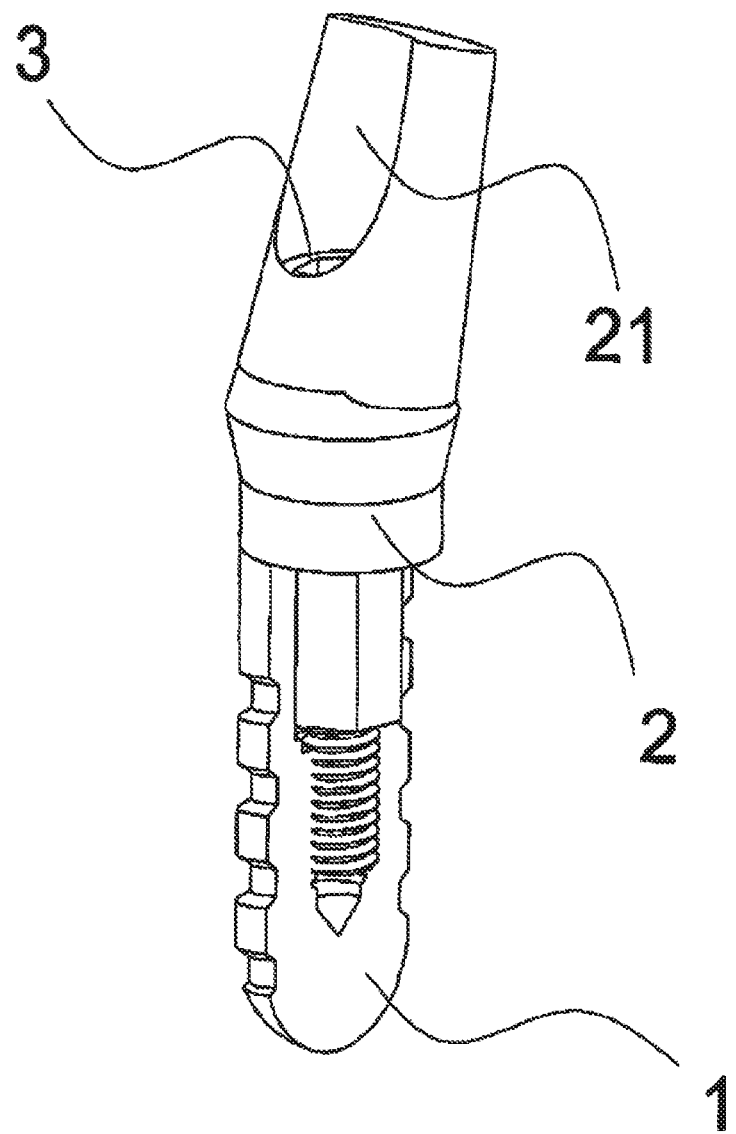
FIG. 4 shows a superstructure mounted on a post part of a dental implant according to an embodiment of the invention.

FIG. 4 shows a superstructure part 2 mounted on a post part 1 by means of a connection screw 3, the post part 1 being shown in a sectional representation for better illustration. In the occlusal direction, a hole 21 is provided, through which the connection screw 3 can be passed. Contrary to the superstructure part 2 of FIGS. 1 and 2, the superstructure part 2 is not straight, but angled. The contact surfaces are oriented planar to each other, except those of the profiled recess and of the contact pin between the superstructure part and the post part.

Figure 5:
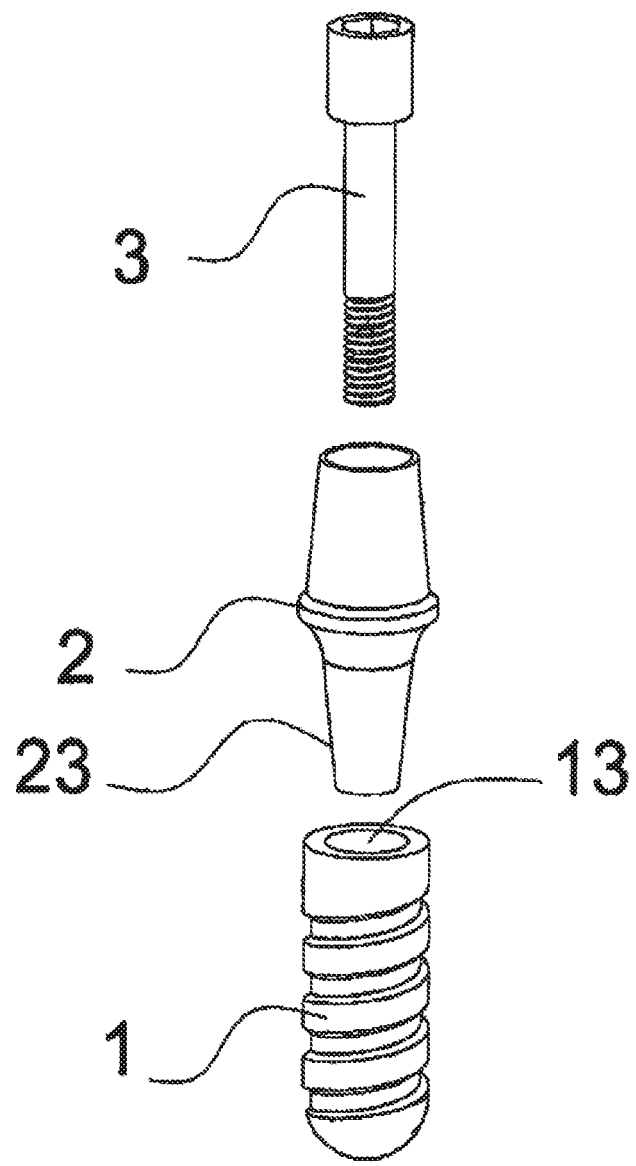
FIG. 5 shows a mounted superstructure with a conically round contact pin of a dental implant according to an embodiment of the invention.
Figure 13:
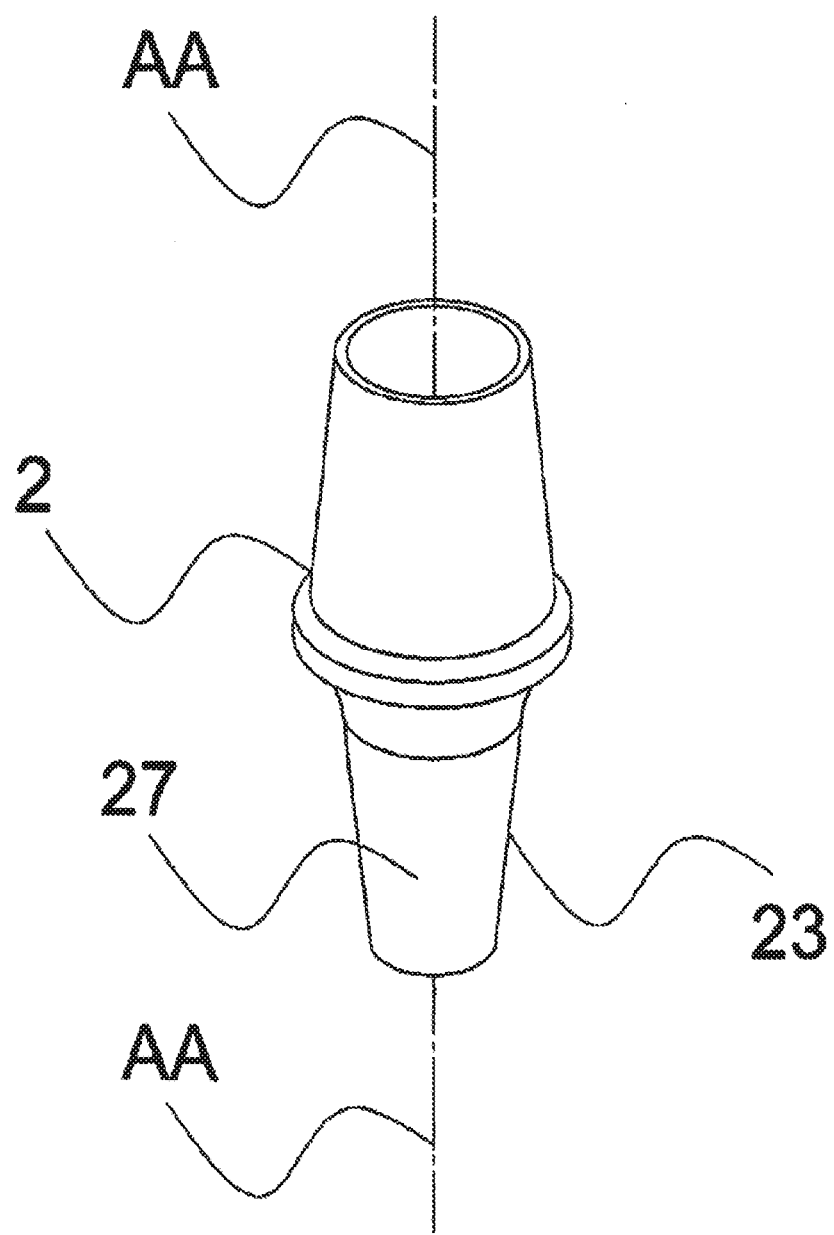
FIG. 13 shows a superstructure of a dental implant according to an embodiment of the invention.

FIG. 5 shows a superstructure part 2 with a conically round profiled recess 13, a superstructure part 2 with a conically round contact pin 23 formed thereon, and an associated connection screw 3. The conically round contact pin 23 is adapted to the conically round profiled recess 13. This design presents no rotational locking mechanism between the superstructure part and the post part. A rotation between the two components is only avoided by an inhibition between the two components. FIG. 13 shows the superstructure part 2 of FIG. 5, wherein it can be recognized that the contact pin 23 is of conical shape. The functional surface 27 has no elements serving as a rotational locking mechanism. The functional surface 27 is conical and is, therefore, inclined to the axis AA of the superstructure part. The cross-sectional area of the contact pin 23 is round. Conically round connections between a post part and a superstructure part are also known, wherein a second contact pin is formed onto the conically round contact pin of the superstructure part in the apical direction.

This second contact pin forms a rotational locking mechanism together with a second profiled recess in the post part, formed in the post part apically of the conically round profiled recess.

Dental implants (post parts) usually have an external thread (FIG. 2), because post parts are in most cases screwed into the jawbone. The post parts are screwed in either via a superstructure part (screw-in superstructure part) pre-assembled for that purpose or via an instrument directly engaging into the post part. That means that the post parts are stored in their packaging either with or without a pre-assembled screw-in superstructure part. The screw-in process itself is effected either manually or by means of a machine supplying the required torque and the desired rotational speed. To transmit the torque from the screw-in instrument or the screw-in superstructure part onto the post part, mostly an inhibition or a locking mechanism between the components is used. When using a locking mechanism, the locking mechanism will later also be used as an indexing. This has the advantage that one and the same geometrical part, in the present case, a locking mechanism, can be used for several applications.

In the past, dental post parts were usually covered with soft tissue after their insertion or were at least not treated prosthetically. The reason for this was the better healing success. In the most recent past, the external threads of dental post parts have been modified to achieve a better anchoring between the post part and the jawbone. The better anchoring quality allows to prosthetically treat and load dental implants earlier or even directly after their insertion. It turned out, however, that in this case, the torque required for screwing in increased. The maximally possible torques are higher than 50 Ncm. As a consequence thereof, it is possible that through an excessively high screw-in torque the indexing in the post part is damaged. Mostly, the treating person does not notice that immediately. In such a case, the consequences may be dramatic. It is possible that an implant whose indexing is damaged cannot be treated prosthetically. As a consequence, it might be necessary to mill the post part out of the bone. The invention is based on the task to avoid this.

Pre-assembled screw-in posts have advantages, but also shortcomings, as compared with screw-in instruments engaging directly into the post part. As advantages of the pre-assembled screw-in superstructure part, it can be mentioned that the connection with the post part is secured with a screw and that the treating person does not have to introduce the instrument into the post part. As advantages of the direct engagement of the instrument, it can be mentioned that the omission of the screw-in superstructure part and the connection screw leads to an enormous cost reduction and that the screw-in instrument does not have to be disassembled after insertion of the post part. It is a disadvantage of the direct instrument engagement that the risk of damaging the indexing, via which the screw-in torque is transmitted, is higher than it is with a pre-assembled screw-in superstructure part. In addition, connection techniques between superstructure parts and post parts exist in which the profiled recess formed in the post part, serving as indexing, is not suited to be directly engaged by a screw-in instrument.

Oval cone connections and conical connections in which the conical part is not round are not suitable for direct engagement with a screw-in instrument, because the transmission of a torque also generates a force pressing the components (post part and screw-in superstructure part) apart. This means that the torque transmission may loosen the connection itself and/or that a jamming between the implant and the screw-in instrument may occur. This effect would complicate the handling and the dealing with such a system.

If the screw-in superstructure part is already pre-assembled, the connection screw will prevent the loosening of the connection.

If the screw-in instrument loosens during screwing in, due to the torque, this may also be a reason for damage to the indexing.

The invention is based on the problem to provide a dental implant of the above-mentioned type, with which a smooth and functional rotational self-centering, working merely through tightening of the connection screw, can be achieved.

This problem is solved according to the invention by the fact that the connection pin or contact pin and, adapted thereto, the receiving channel associated with it or the profiled recess, include in each case in an indexing area, in the manner of a conical design, a plurality of contact surfaces inclined to the longitudinal axis of the first implant part, at least one of the contact surfaces being provided on at least one implant part with a friction-reducing coating.

Consequently, the friction between the contact surfaces of the superstructure part, of the post part and/or the connection screw is reduced by a coating or surface modification of at least one contact surface, in order to avoid a rotationally inhibiting effect during assembly. It would also be possible to apply slip agents, but this has to be considered as doubtful for clinical reasons. Mechanical, chemical and/or electrochemical polishing is another approach to the problem, but has turned out in corresponding internal test series as possibly being not always sufficient.

For a dental implant in which an unround conical part is used, in particular for the indexing, the risk of damaging the indexing, on the one hand, and the loosening and jamming, on the other hand, can be prevented in a particularly advantageous development by fixing a second locking mechanism below the unround cone part. Preferably, this locking mechanism serves exclusively or mainly for transmitting the torque and not for indexing for prosthetic applications at a later date. Preferably, this locking mechanism is not conical, in order to prevent the self-loosening effect. Should the screwing-in process lead to a damage of the locking mechanism, this will not influence the prosthetic treatment of the post part.

Before incorporating the dental prosthesis on multi-part dental implants, the superstructure parts are fastened or fixed in or on the post part osseointegrated/anchored in the jawbone. This fastening is in most cases effected by screwing, deadlocking (e.g. conical self-inhibition) and/or gluing. Most connections between the superstructure part and the post part have a more or less precise positioning in vertical, horizontal and rotational orientation. With regard to the rotational orientation, there is usually no definite positioning. This mostly indefinite or multiple positioning is called indexing. The number of indexings or positioning possibilities of the superstructure part on the post part mostly lies between two and twelve, preferably between two and six, and indexings in which the number of positionings lies between two and four have in particular proved successful. The more positioning possibilities exist, the more difficult it is for the dentist to find the correct position upon the first attempt to incorporate the superstructure part in the post part. Usually, the post part and the superstructure part form a rotational locking mechanism via this indexing in the assembled condition. These rotational locking mechanisms have in most cases parallel walls. That means that in the rotational locking mechanism the parts provided for the locking mechanism are not conical, with the consequence that in case of a rotational load, caused e.g. by a torque around the axis of the superstructure part, which is exerted upon the superstructure part, the torque is directly forwarded onto the post part via the frictional connection or the moment connection and thus, consequently, via the geometry of the locking mechanism. A pure moment load, which is transmitted onto the superstructure part, leads to a pure moment load upon the post part, too.

When the superstructure part is incorporated in or on the post part, the correct rotational position has to be found prior to the final seating. If the connection is, for example, a hexagon, the superstructure part is rotated until it is in the rotationally exact position and then the superstructure part can plunge into the post part or vice versa. The plunging of the components into each other is a purely translatory movement. A rotation during plunging or in the plunged condition will at most take place within the framework of the work tolerances.

As soon as a final assembly is effected between the superstructure part and the post part by means of a connection screw, an inhibition additionally exists between the two components. This inhibition is effected by the static friction caused by the contact pressure force between the post part and the superstructure part, exerted by the connection screw. If the interface between the post part and the superstructure part is conical, this static friction will increase mainly as a function of the cone angle, and even a self-inhibition may arise.

Figure 6:
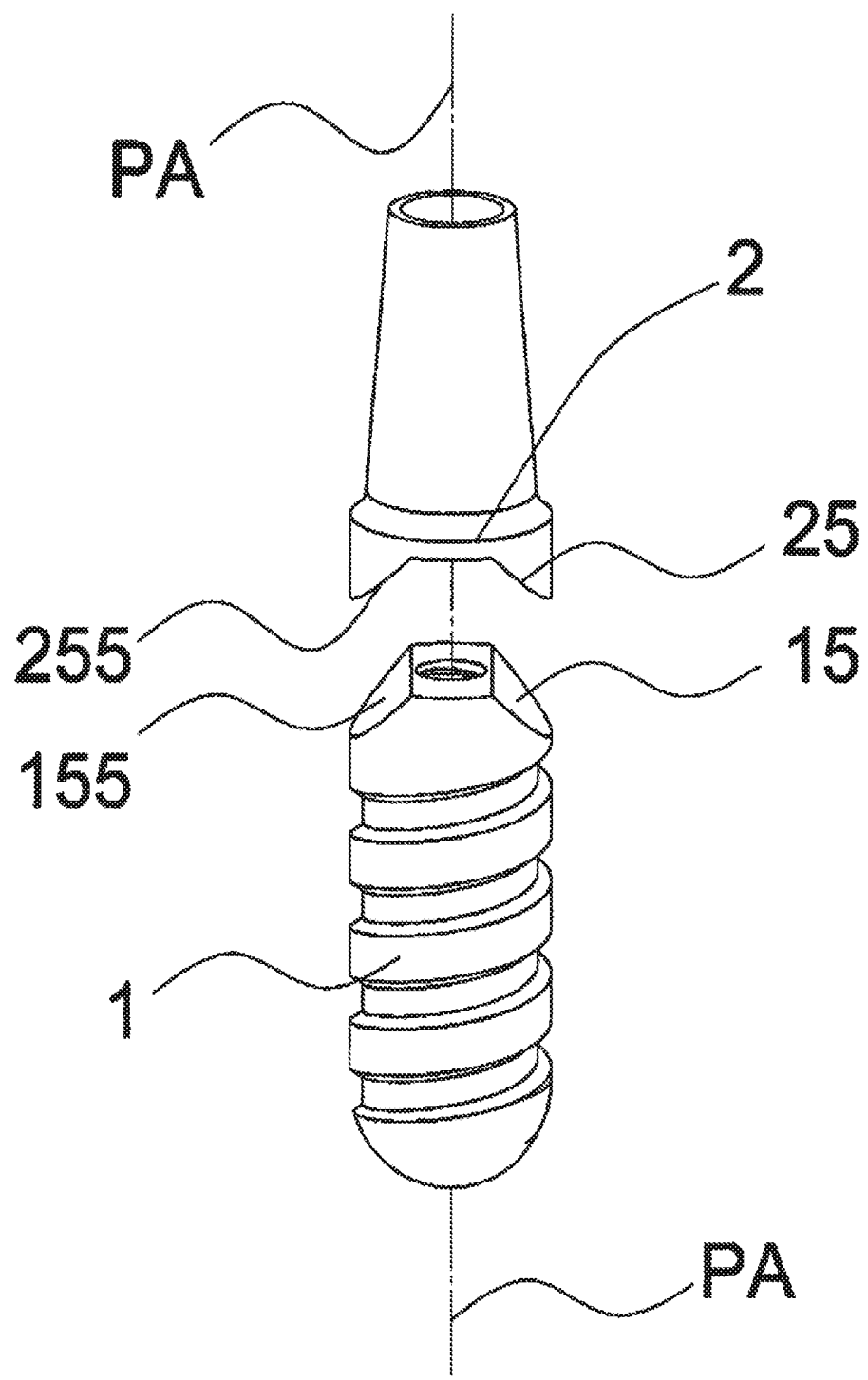
FIG. 6 shows a connection of a post part and superstructure of a dental implant according to an embodiment of the invention.

There are connection types in which the walls of the indexing or the rotational locking mechanism are not parallel. FIG. 6 shows a connection in which the post part 1 is provided with two gable roof-type functional surfaces 15 and 155 which match the functional surfaces 25 and 255 provided on the superstructure part 2. These surfaces are not parallel to the axis PA of the post part and are, therefore, inclined to the axis PA of the post part. Due to the inclination of the functional surfaces to the axis of the post part, the superstructure part and the post part form a rotational locking mechanism only when the connection screw is in the assembled condition. If the connection screw is not assembled and if the functional surfaces of the superstructure part rest on the functional surfaces of the post part and if a moment occurs between the components, the latter will rotate against each other and move away from each other.

Figure 7:
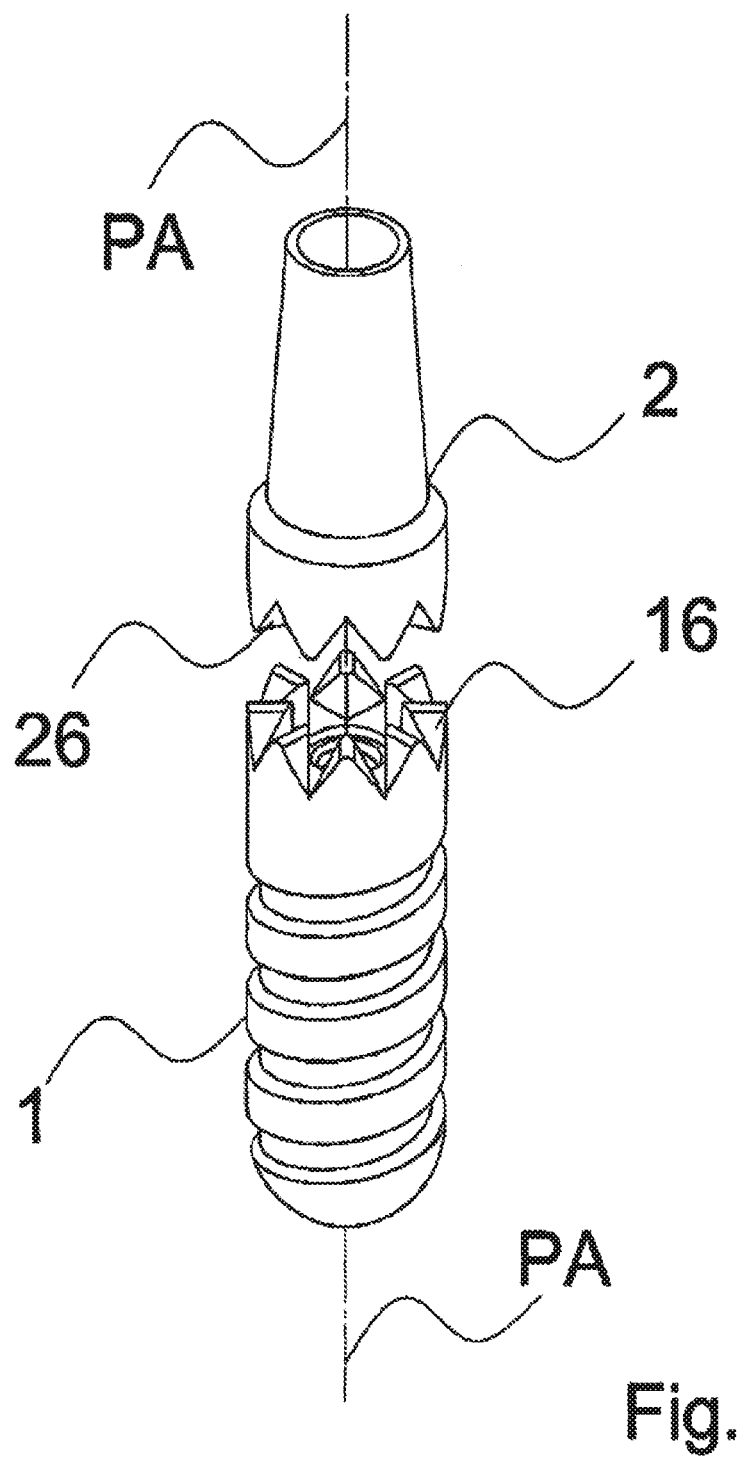
FIG. 7 shows an interlocking of a dental implant according to an embodiment of the invention.

FIG. 7 shows a type of interlocking which can be used as an indexing and as a rotational locking mechanism. The functional surfaces 16 and 26 are not parallel to the axis PA of the post part and are, therefore, inclined to the axis PA of the post part. Due to the inclination of the functional surfaces to the axis of the post part, the superstructure part and the post part form a rotational locking mechanism only when the connection screw is in the assembled condition. If the connection screw is not assembled and if the functional surfaces of the superstructure part rest on the functional surfaces of the post part and if a moment occurs between the components, the latter will rotate against each other and move away from each other.

Figure 8:
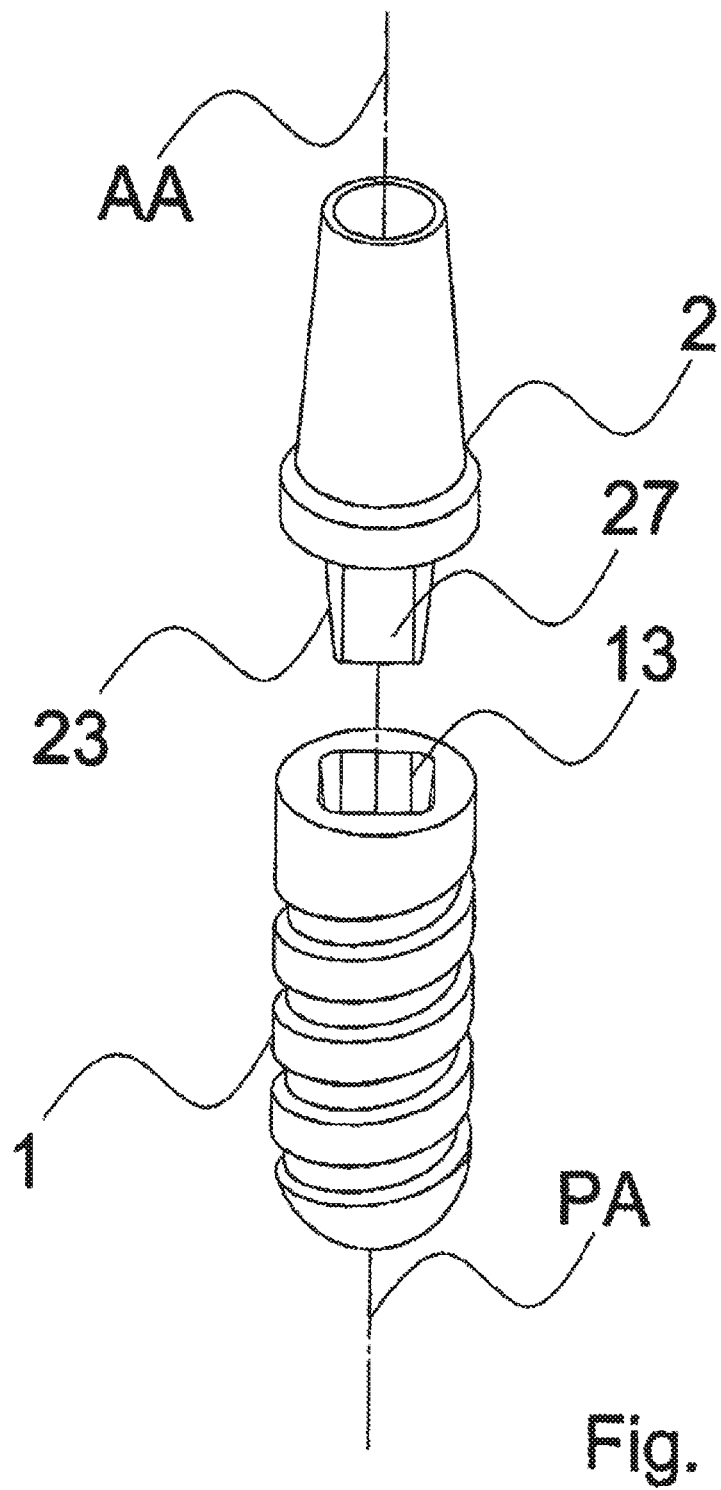
FIG. 8 shows a cone connection with a square with rounded corners cross-sectional area of a dental implant according to an embodiment of the invention.

FIG. 8 shows a cone connection in which the cross-sectional area is not round, but includes a square with rounded corners. The functional surfaces 17 and 27 are not parallel to the axis PA of the post part and are, therefore, inclined to the axis PA of the post part. Due to the inclination of the functional surfaces to the axis of the post part, the superstructure part and the post part form a rotational locking mechanism only when the connection screw is in the assembled condition. If the connection screw is not assembled and if the functional surfaces of the superstructure part rest on the functional surfaces of the post part and if a moment occurs between the components, the latter will rotate against each other and move away from each other.

Figure 9:
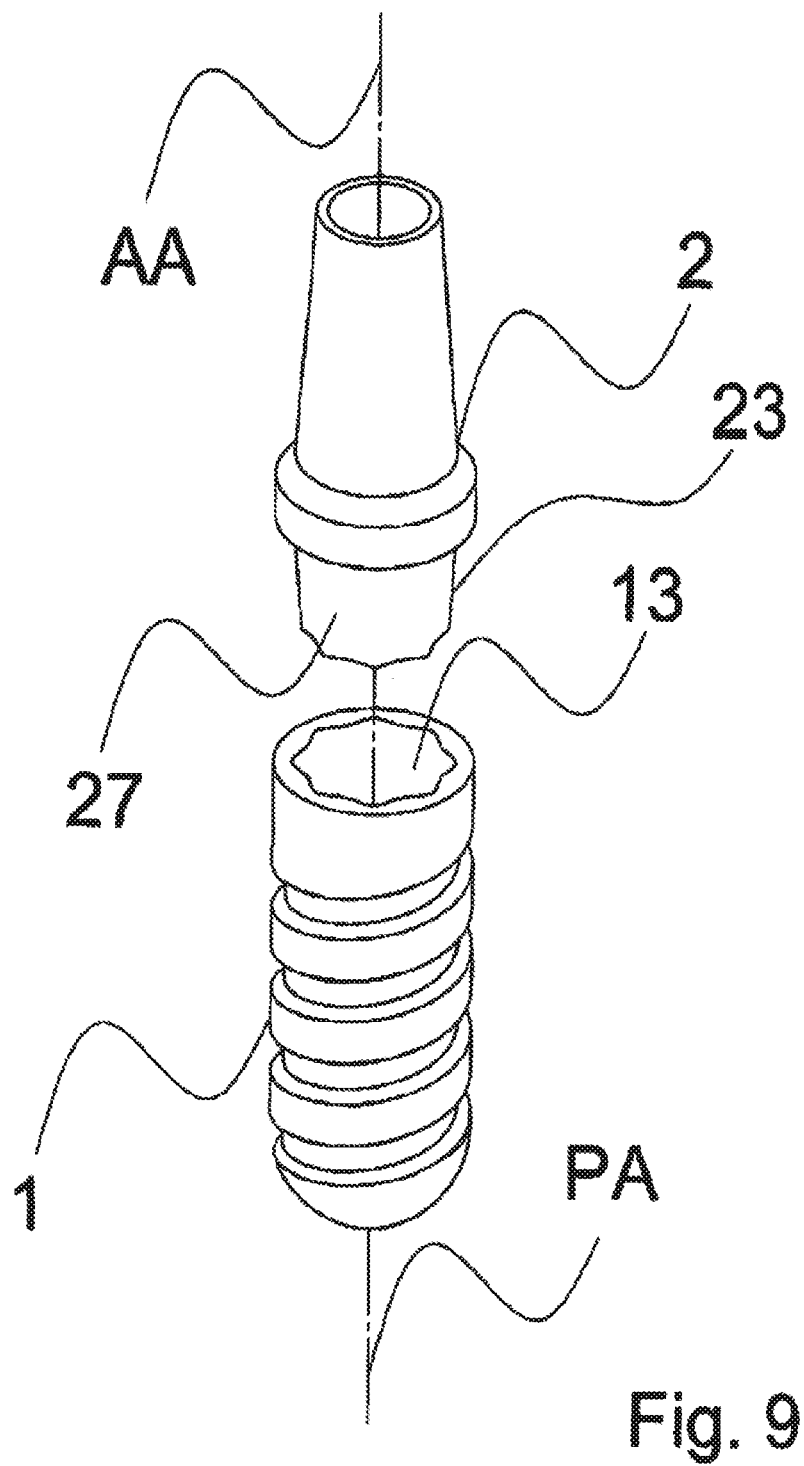
FIG. 9 shows a cone connection with concave and convex parts cross-sectional area of a dental implant according to an embodiment of the invention.

FIG. 9 shows a cone connection in which the cross-sectional area is not round, but includes concave and convex parts. The functional surfaces 17 and 27 are not parallel to the axis PA of the post part and are, therefore, inclined to the axis PA of the post part. Due to the inclination of the functional surfaces to the axis of the post part, the superstructure part and the post part form a rotational locking mechanism only when the connection screw is in the assembled condition. If the connection screw is not assembled and if the functional surfaces of the superstructure part rest on the functional surfaces of the post part and if a moment occurs between the components, the latter will rotate against each other and move away from each other.

Figure 10:
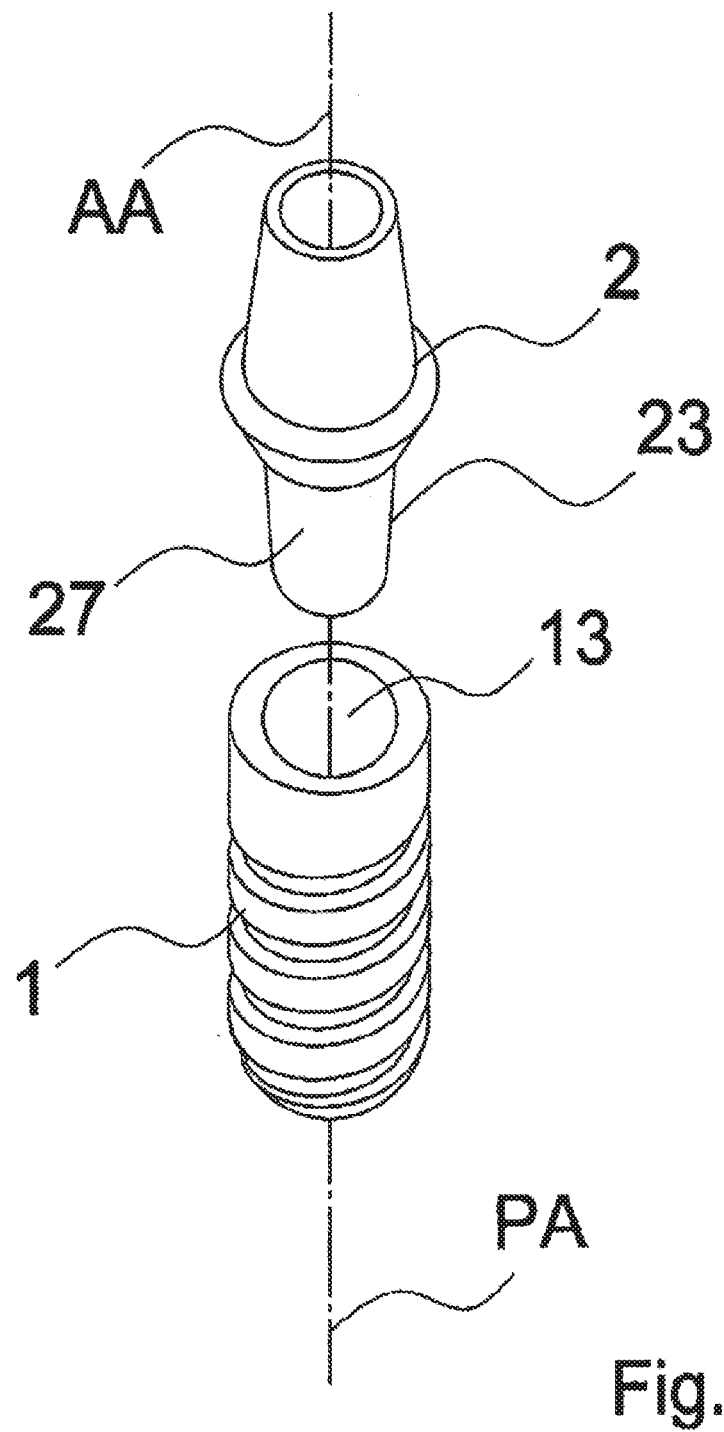
FIG. 10 shows a post part and a superstructure with an oval cross-sectional area of a dental implant according to an embodiment of the invention.
Figure 14:
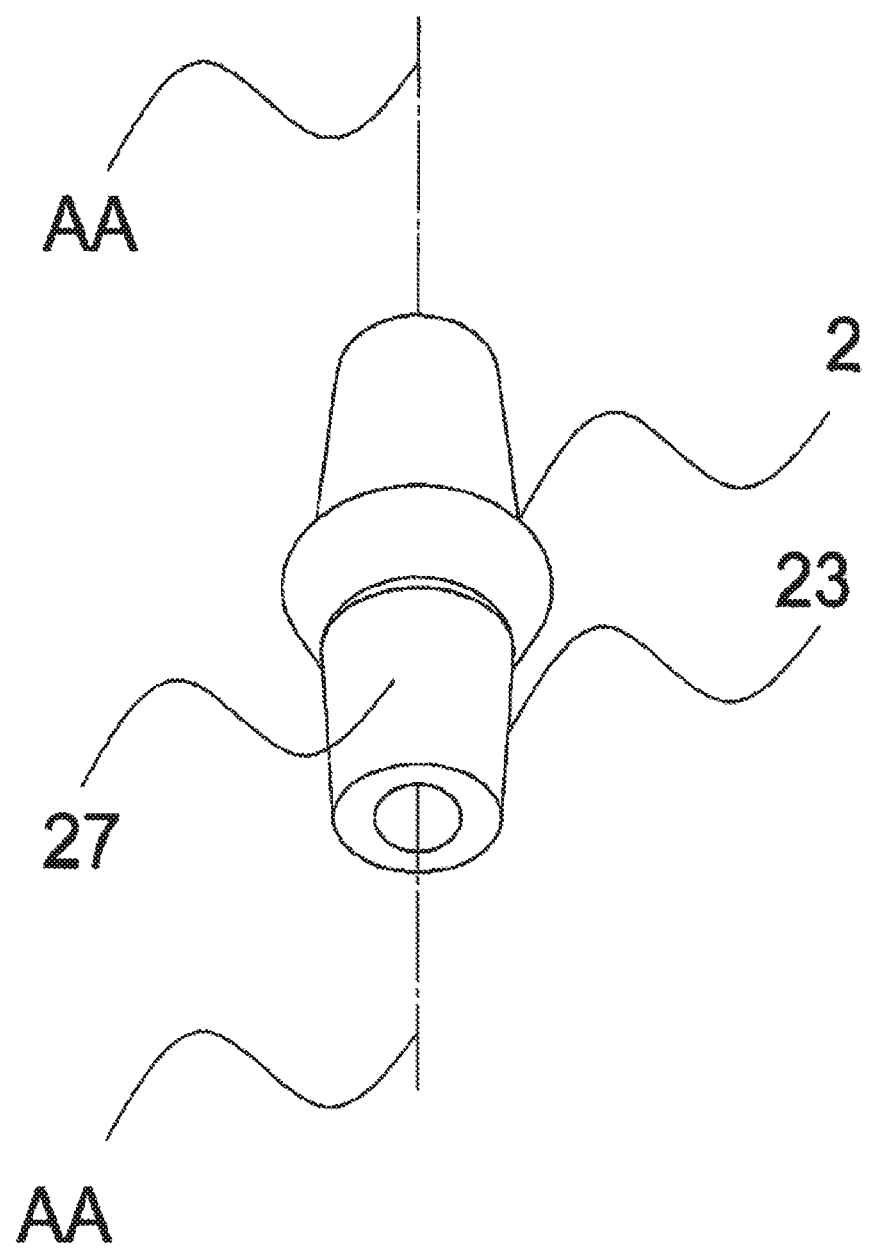
FIG. 14 shows a superstructure of a dental implant according to an embodiment of the invention.
Figure 15:
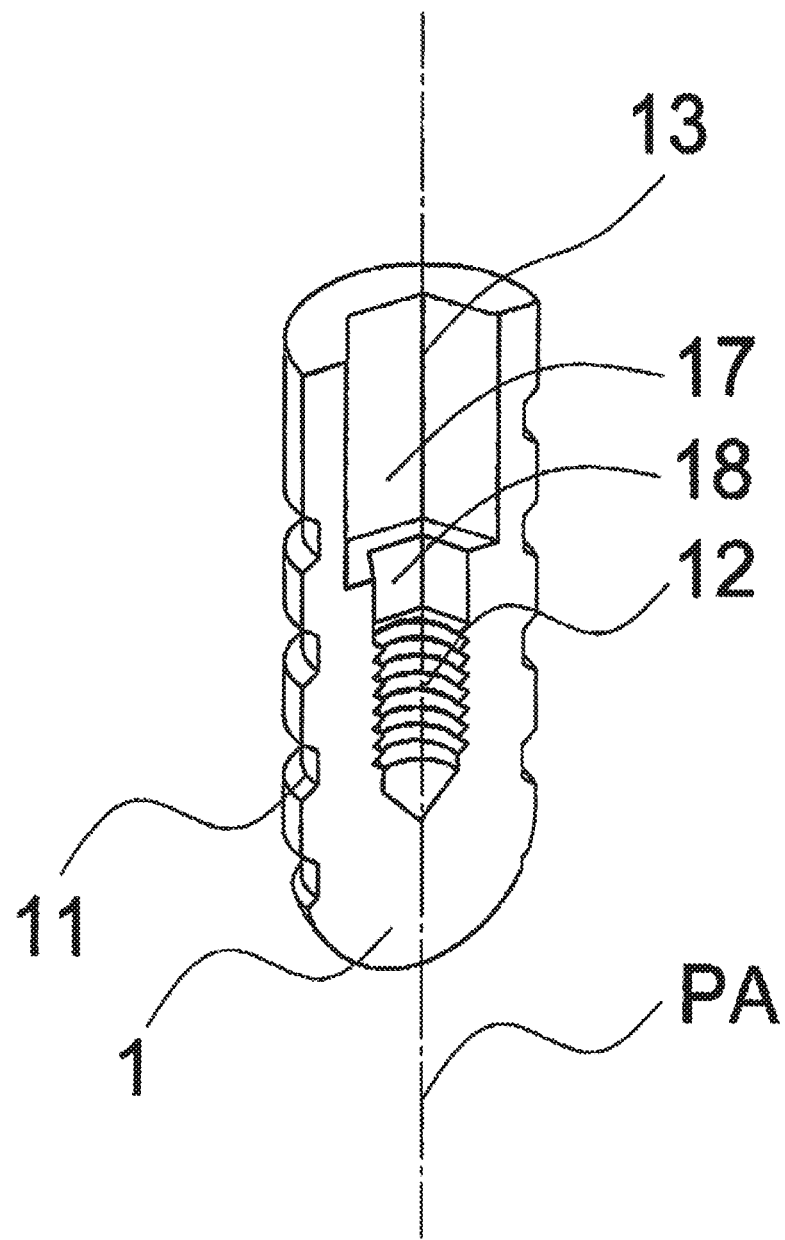
FIG. 15 shows a post part of a dental implant with a second indexing according to an embodiment of the invention.

FIG. 10 shows the post part 1 with an oval/elliptic profiled recess 13 and a superstructure part 2 in which the cross-sectional area of the contact pin 23 formed onto the superstructure part 2 is not round, but oval. FIG. 14 shows such a superstructure part, and one will recognize that the cross-sectional area of the contact pin 23 is oval/elliptic and that the associated functional surface 27 is conical and is, therefore, inclined to the axis AA of the superstructure part. As to the explanation of oval cone connections between a post part and a superstructure part, reference is made to the publications DE 10 2008 054 138.9 and PCT/EP 2009/007702, whose corresponding explanations are incorporated by reference into the present description.

The common feature of the types of connection between the superstructure part and the post part of FIG. 6 to FIG. 10 and the oval cone connections explained in the publications DE 10 2008 054 138.9 and PCT/EP 2009/007702 lies in the fact that the geometries forming the rotational locking mechanism between the superstructure part and the post part do not have parallel walls or that no functional surface is parallel to the axis of the post part and or to the axis of the superstructure part, but that the functional surface(s) are either inclined to the axis of the post part and to the axis of the superstructure part and/or are conical.

These conical parts of the rotational locking mechanism or these conical rotational locking mechanisms are, strictly speaking, no pure rotational locking mechanisms, because, when a moment which is applied on the superstructure part and directed around the latter's axis is transmitted, no pure moment is forwarded to the post part. Between the superstructure part and the post part, a torque and a force directed such that the superstructure part and the post part push off from each other are effective. The amount of this force depends on the geometry of the connection and on the properties of static and sliding friction of the connection partners at the mutual contact points. When the connection between the post part and the superstructure part is in its final assembled condition, i.e. with assembled connection screw, this effect as a function of the geometrical shape has hardly any influence. The smaller the cone angle is and the higher the static and sliding friction is, the lower is the force pushing the components apart. The larger the cone angle is and the lower the static and sliding friction is, the higher is the part of the force pushing the components apart.

This pushing apart influences the practical application of dental implants in various ways. Insertion of a post part into the bone is effected via a rotation because the external geometry of the post parts usually includes a thread by means of which the post part is anchored in the bone. The post part is screwed in by means of a screw-in tool. This tool engages either directly into the rotational locking mechanism/the indexing for transmission of the required torque or via a screw-in superstructure part pre-assembled on the post part. This screw-in superstructure part is in most cases fastened on the post part by means of a connection screw and uses the indexing as a rotational locking mechanism for transmission of the torque required for screwing in. In the direction of the screw-in tool, there is in most cases another rotational locking mechanism. If the connection between the post part and the superstructure part of a dental implant is a rotational locking mechanism with conical parts, the post part can probably be inserted without problems using a screw-in superstructure part pre-assembled by means of a connection screw. As these screw-in superstructure parts and the connection screws associated therewith will be disassembled after the insertion of the post part into the bone and can then not be reused any more, additional costs arise and superfluous disassembly processes take place. If it is possible to engage the screw-in tool directly into the post part, costs for the patient and work on the patient can be omitted. This is an enormous advantage, but is difficult with a connection possessing conical or inclined functional elements in the indexing. The higher the static and sliding friction between the contact surfaces of the superstructure part and the post part is, the lower is the force pushing the components apart and the lower is the risk of a complication during screwing in of the post part into the bone using a screw-in tool which engages directly into the post part and which engages via a conical indexing.

The designs of the connection between the superstructure part and the post part of a dental implant as shown in FIG. 6 to FIG. 10 also offer, however, clear advantages. When mounting a superstructure part in a post part with a purely parallel-walled indexing (rotational locking mechanism without conical functional geometries and, during transmission of moments around its axis, with pure forwarding of moments, without arising of a force pushing the components apart), the exact position between the superstructure part and the post part must be given prior to the translatory incorporation. With connections as shown in FIG. 6 to FIG. 10, the effect of transforming a pure moment into the superimposition of a moment and a force can also be utilized vice versa. When incorporating the superstructure part into the post part, it is not necessary that the indexing between the superstructure part and the post part is exactly aligned. If the positions do not exactly coincide, the (purely translatory) movement of the components towards each other can force a superimposed rotation. If the surfaces of the indexing of the superstructure part and the post part come into contact with each other, but are not rotationally aligned with each other, the translatory movement will be transformed into a translatory and a rotational movement. Consequently, when joining the components, there will be a rotational alignment or a rotational self-centering of the superstructure part in the post part. This effect makes it easier to find the indexing and, thus, to incorporate the superstructure part into or onto the post part. It is important for the rotational self-centering that the rotation of the superstructure part is not hindered. If the rotational self-centering shall be utilized while screwing in the connection screw, the superstructure part might have to be centered for the final position automatically with right-hand rotation or automatically with left-hand rotation. If the automatic centering takes place in the direction of rotation of the screw, the latter will assist the self-centering effect. If the automatic centering takes place contrary to the direction of rotation of the screw, the latter will counteract the self-centering effect. The dimensioning of the cone angle, the pairing of the material of superstructure part and post part, and the surface quality also have a great influence on the quality of the self-centering. It is particularly advantageous if the static friction and the sliding friction between the contact surfaces of the conical indexing between the superstructure part and the post part are as low as possible.

Tests with conical self-centering indexings have shown that the smaller the cone angle is, the higher is the probability of a conical self-inhibition between the superstructure part and the post part. This self-inhibition is, in fact, desired, but only in the final position of the superstructure part in or on the post part. If an inhibition takes place between the two components before the rotational final position is reached, e.g. due to the fact that the superstructure part would have to self-center contrary to the direction of rotation of the connection screw, the simplification desired with the self-centering will not be achieved. It turned out that, contrary to conventional indexings incorrectly assembled, the inhibition loosens by shaking the superstructure part and is, therefore, quickly noticed, and that then, the superstructure part continues to center, but this configuration is not yet satisfactory.

Connections as shown in FIG. 6 to FIG. 10 possess a rotational self-centering. That means that during incorporating or joining the superstructure part and the post part or placing them one on top of the other, a rotational movement is forced or a torque is generated, though not in all rotational positions, but often assisted by an axial force. In this case, similar to various gearing mechanisms, a purely translatory movement results in a rotational movement. This will be referred to in the following as rotational self-centering. In the opposite case, however, in the assembled condition, a torque acting upon the assembled components, also results in an axial force. The rotational self-centering greatly simplifies the incorporation of a superstructure part into a post part. The dental technician can analogously make use of this simplification when incorporating the superstructure part into the post part integrated into the plaster model (positive situation of the patient's mouth) during the manufacture of the individual dental prosthesis. Another simplification is given when the superstructure part is incorporated into the post part in the patient's mouth.

The choice and configuration of the connection parameters (e.g. roof angle, cone angle, eccentricity of oval cone connections, differences in diameters, local maxima and local minima, etc.) have a great influence on the quality of the self-centering. Through these parameters, the transmission ratios of the transformation of a translatory movement into a rotational movement or vice versa can be set or defined. Similar to gearing mechanisms, the friction between the contact surfaces of the movable partners, in this case, the superstructure part and the post part, has great influence on the smooth running. There is the risk that in case of excessive friction between the superstructure part, the post part and/or the connection screw, the superstructure part jams with the post part or, due to the further increasing axial force via an inhibition, no rotation takes place between the superstructure part and the post part. Therefore, the friction between the contact points of the superstructure part and the post part has great influence on the smooth running and reliability of the self-centering. Furthermore, the friction between the connection screw and the post part (via the thread), but in particular the friction between the connection screw and the superstructure part (via the screw seat) has great influence on the smooth running of the rotational self-centering.

Figure 11:
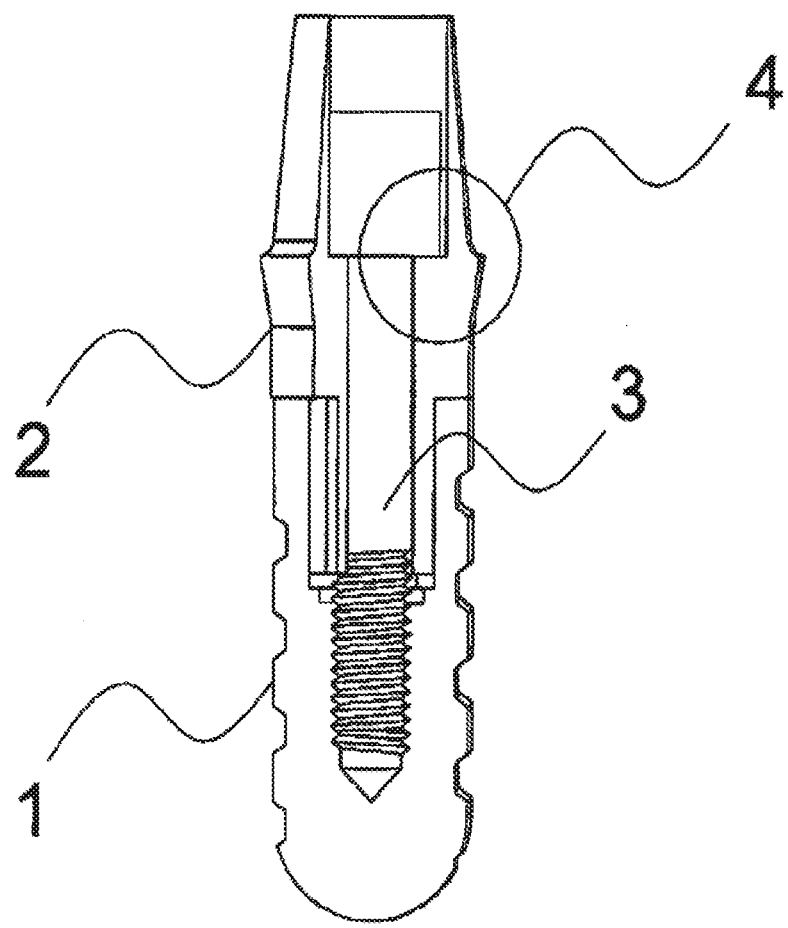
FIG. 11 shows a post part and a superstructure assembled of a dental implant according to an embodiment of the invention.
Figure 12:
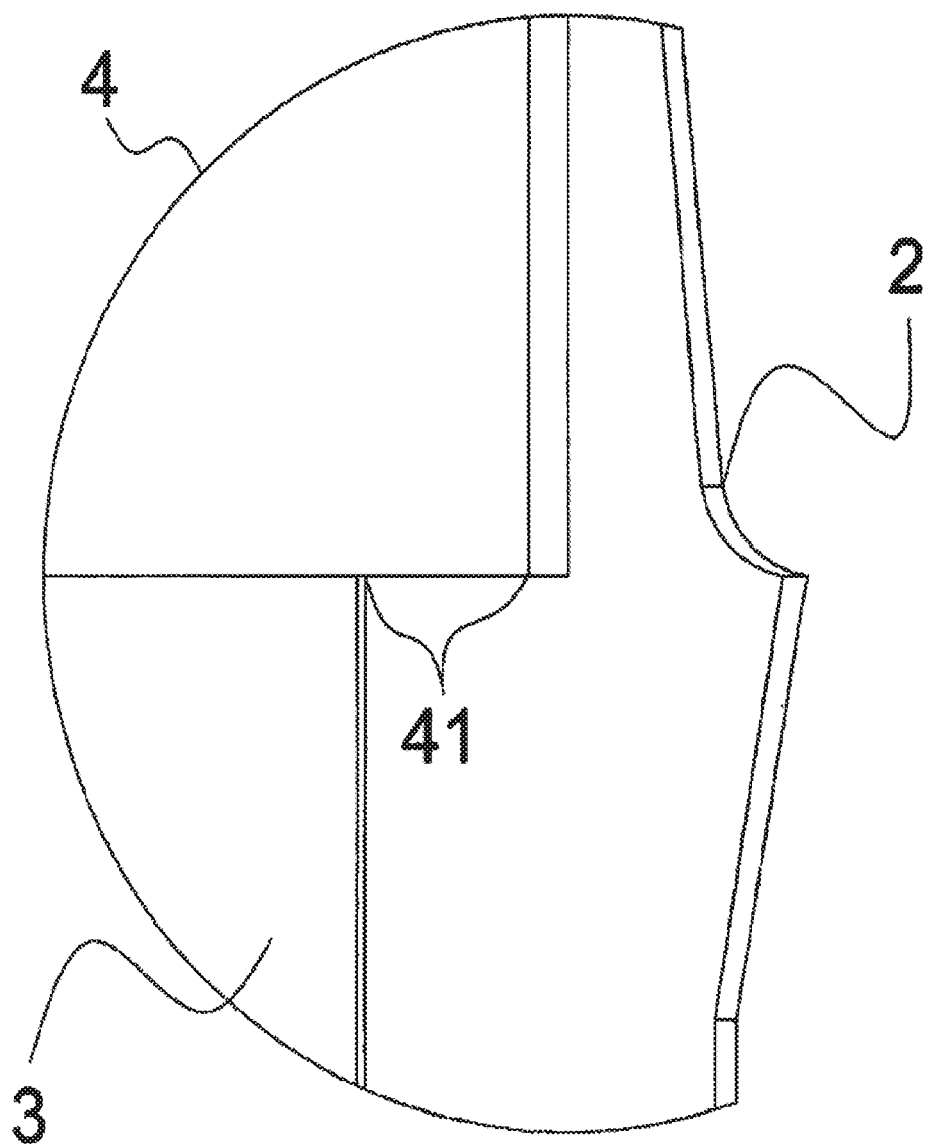
FIG. 12 shows a screw seat of a superstructure of a dental implant according to an embodiment of the invention.

FIG. 11 shows a sectional view of a post part 1 with a superstructure part 2 assembled by means of the connection screw 3 and represented in a partial sectional view. The detail marked with reference number 4 shows the screw seat in the superstructure part 2. FIG. 12 shows an enlargement of the detail marked with number 4 in FIG. 11. The screw seat 41 forms the contact surface between the superstructure part 2 and the connection screw 3. This contact surface (screw seat 41) can be planar, as shown here, but can also be conically inclined or curved. The reduction of the static and sliding friction on the contact surfaces considerably assists the smooth running during the rotational self-centering.

The static friction and the sliding friction of the following contact points have an influence on the functionality of the rotational self-centering.
1. The contact surfaces of the conical indexing of the superstructure part and the post part.
2. The contact surfaces between the connection screw and the superstructure part, i.e. the screw seat in the superstructure part and the screw seat on the head of the connection screw.

Influencing the properties of the static and sliding friction of the surfaces described in paragraphs 1. and 2. above has a decisive influence on the functionality of the rotational self-centering.

There are different degrees of difficulty for inserting superstructure parts into the patient's mouth. If a superstructure part has to be inserted in the area of the front teeth, this area is in most cases easy to access. If, however, a superstructure part has to be inserted in the area of the lateral teeth, this will be more difficult, because this area is difficult to access and is more strongly influenced, e.g. through the ability to open one's mouth, than the area of the front teeth. It happens quite frequently that superstructure parts are inserted and are not in the correct rotational position at the first attempt. It may also happen, in particular with conical connection types between the superstructure part and the post part, in which an indexing is applied apically of the cone surfaces, that the connection screw grips in the post part, although the rotational position is not correct and before the rotational locking mechanism of the indexing engages. That means that the superstructure part has not been inserted in its final position (and is consequently seated too high) and the connection screw can, nevertheless, be screwed in. In most cases, the treating dentist will not notice this until he tries to seat the dental prosthesis. Another problem is the fact that thereby, areas of the superstructure part or of the post part might be damaged. It would, therefore, be a considerable optimization if the superstructure part would automatically center, with regard to the rotational orientation, as soon as the connection screw grips in the post part.

The following surface modifications have shown a positive effect on the smooth running: simple anodizing (electrochemical generation of an oxide layer), titanium nitriding or titanium-nitride coating, chromium-nitride coating, anodizing type II, and DLC (Diamond-Like Carbon or Diamond-Like Coating) (monocrystalline and/or polycrystalline carbon/diamond coating). Through these processes, the friction between the connection partners can be reduced so far (even if not all contact surfaces are coated) that in the different connection types, a rotational self-centering by tightening the connection screw was fully given, using the clinically and mechanically reasonable parameters.

It is of great importance that the adhesion and friction-modifying modification or coating is tissue-compatible and does not irritate the hard tissue and/or soft tissue.

The coating of the contact surfaces between the superstructure part and the post part and the coating of the screw seat in the superstructure part and the screw seat on the connection screw had the greatest influence. It could, however, be observed that the coating of only one surface has already a positive influence. The coating of the screw seat on the connection screw or of the contact surface of the superstructure part in the direction of the post part alone improved the smooth running considerably.

Tests have shown that the reduction of the contact surfaces of the predominantly conical functional surfaces of the indexing led to an extraordinary success in internal connections between the post part and the superstructure part. Internal connections are characterized in that a profiled recess is formed in the post part, into which a contact pin formed onto the superstructure part engages (FIG. 8 to FIG. 9). In these connection types, the cone angles are mostly clearly smaller than in the connection types shown in FIG. 6 and FIG. 7. In the connection types represented in FIG. 8 to FIG. 10, the risk of jamming or inhibiting before the superstructure part reaches its final seat in the post part is higher. The functionality could be optimized in particular in the oval cone connections.

When comparing the desired properties of indexings with conical functional surfaces and rotational self-centering with regard to the insertion to a screw-in tool directly engaging into the post part and with regard to the quality of the self-centering, one will notice that the favoring properties of sliding and static friction work in opposite directions. The described invention counteracts the insertion by means of a screw-in tool directly engaging into the post part.

The invention should solve this difficulty, too. The problem is solve according to the invention by separating the rotational locking mechanism with the function of indexing the superstructure part in the post part from the function of the screw-in process, by installing, below the indexing with a rotational self-centering, in the post part another indexing 18, which has parallel walls and does not generate a force pushing the components apart under rotational load. This second indexing 18 is used exclusively for inserting the post part into the jawbone. Therefore, any damage occurring will not affect the later function between the superstructure part and the post part. Type and geometry of the additional rotational locking mechanism in the post part can be manifold. In a particularly advantageous embodiment, the number of usable positions of the profiled recess used for indexing is identical with the number of possible rotational positions in the rotational locking mechanism used for the insertion. The advantage consists in that during the insertion, the treating person can recognize by the screw-in tool where the positioning possibilities of a superstructure part are, if the screw-in tool is provided with corresponding markings.

The lower the number of positioning possibilities of the superstructure part on the post part is, the more important is it that the treating dentist knows in which way the indexing/ the rotational locking mechanism is oriented in the jawbone. Consequently, it is very important that the number of positioning possibilities of the index provided with the functional surfaces inclined to the axis of the post part or to the axis of the superstructure part, which serves for indexing the superstructure part, and of the index provided with functional surfaces oriented in parallel to the axis of the post part or to the axis of the superstructure part, which serves for screwing in the post part, is identical. In this way, it is possible to place on the screw-in instrument and/or on the screw-in superstructure part markings by means of which the treating person can recognize the rotational orientation of the indexing or of the rotational locking mechanism.

LIST OF REFERENCE NUMBERS

1 Post part/dental implant
11 External thread on the post part 1
12 Internal thread in the post part 1
13 Profiled recess in the post part 1
15 Roof surface on the post part 1
155 Roof surface on the post part 1
16 Interlocking element/interlocking surface on the post part 1
17 Indexing/locking functional surface in the profiled recess 13 of the post part 1
18 Second Indexing
2 Superstructure part
21 Screw channel in the superstructure part 2
22 Connection piece at the superstructure part 2 for fastening a dental prosthesis
23 Contact pin at the superstructure part 2
24 Area of penetration through the mucous membrane of the superstructure part 2
25 Roof surface at the superstructure part 2
255 Roof surface at the superstructure part 2
26 Interlocking element/interlocking surface at the superstructure part 2
27 Indexing/locking functional surface at the superstructure part 2
3 Connection screw for positioning the superstructure part 2 on the post part 1
4 Detail/enlarged detail of the screw seat of the screw 3 in the superstructure part 2
41 Screw seat/contact surface between the connection screw 3 and the superstructure part 2
AA Axis of the superstructure part
PA Axis of the post part

What is claimed is:

1. A dental implant, comprising:
a first implant part provided for being inserted into a jawbone and a second implant part associated therewith, provided for fixing a dental prosthesis;
a contact pin formed onto one of the first and second implant parts, wherein the first and second implant parts are mechanically connectable to each other via the contact pin; and
a receiving channel provided in the other implant part and adapted to receive the contact pin,
wherein the contact pin and, adapted thereto, the receiving channel associated with the contact pin, each include in a first indexing area, a plurality of contact surfaces inclined against a longitudinal axis of the first implant part, at least one of the contact surfaces of the first indexing area on at least one of the first and second implant parts being provided with a friction-reducing coating,
wherein the first implant part provided for being inserted into the jawbone includes a second indexing area with a number of walls, and
wherein the first indexing area and the second indexing area are designed for the same number of positioning possibilities.

2. The dental implant of claim 1, wherein, in the first indexing area, all contact surfaces of the first and second implant parts are provided with a friction-reducing coating.

3. The dental implant of claim 1, whose first and second implant parts can mechanically be connected to each other via a connection screw, wherein a screw seat for the connection screw in the first and second implant parts is provided with a friction-reducing coating.

4. The dental implant of claim 1, wherein the second indexing area includes functional surfaces which are conical in relation to the longitudinal axis of the contact pin.

5. The dental implant of claim 1, wherein the second indexing area includes functional surfaces which are oriented substantially parallel to the longitudinal axis of the first implant part.

6. The dental implant of claim 1, wherein the second indexing area comprises a rotational locking mechanism.

7. The dental implant of claim 1, wherein the second indexing area comprises at least one planar surface.

8. The dental implant of claim 1, wherein at least one of the contact surfaces of the first indexing area on at least one of the first and second implant parts comprises a planar surface.

9. The dental implant of claim 1, wherein the first indexing area is configured for six positioning possibilities.

10. The dental implant of claim 1, wherein the second indexing area is configured to engage a tool.

11. The dental implant of claim 1, wherein the second indexing area includes six functional surfaces which are oriented substantially parallel to the longitudinal axis of the first implant part.

* * * * *